US011746481B2

(12) United States Patent
Dzomo et al.

(10) Patent No.: US 11,746,481 B2
(45) Date of Patent: Sep. 5, 2023

(54) GROUND MILLING MACHINE

(71) Applicant: BOMAG GMBH, Boppard (DE)

(72) Inventors: Gerome Dzomo, Urbar (DE); Thomas Thelen, Monreal (DE)

(73) Assignee: BOMAG GMBH, Boppard (DE)

( * ) Notice: Subject to any disclaimer, the term of this patent is extended or adjusted under 35 U.S.C. 154(b) by 170 days.

(21) Appl. No.: 16/039,017

(22) Filed: Jul. 18, 2018

(65) Prior Publication Data

US 2019/0025037 A1   Jan. 24, 2019

(30) Foreign Application Priority Data

Jul. 18, 2017  (DE) .................... 20 2017 003 790.4

(51) Int. Cl.
*E01C 23/088* (2006.01)
*E01C 23/12* (2006.01)
*G01B 5/18* (2006.01)

(52) U.S. Cl.
CPC .......... *E01C 23/088* (2013.01); *E01C 23/127* (2013.01); *G01B 5/18* (2013.01)

(58) Field of Classification Search
CPC ........ E01C 23/088; E01C 23/127; G01B 5/18
See application file for complete search history.

(56) References Cited

U.S. PATENT DOCUMENTS

| 4,270,801 A | * | 6/1981 | Swisher, Jr. | .......... | E01C 23/088 180/6.48 |
| 6,296,318 B1 | * | 10/2001 | Simons | ................. | E01C 23/088 198/300 |

(Continued)

FOREIGN PATENT DOCUMENTS

| DE | 102006062129 | 7/2008 |
| DE | 102008024651 | 4/2009 |

(Continued)

OTHER PUBLICATIONS

Search Report from corresponding German Appln. No. 20 2017 003 790.4, dated Mar. 9, 2018.

*Primary Examiner* — Janine M Kreck
*Assistant Examiner* — Michael A Goodwin
(74) *Attorney, Agent, or Firm* — Grossman, Tucker, Perreault & Pfleger, PLLC

(57) ABSTRACT

The invention relates to a ground milling machine, comprising: a machine frame supported by front and rear travel units and at least partially height-adjustable; a milling drum housing arranged on the machine frame, comprising a milling drum that is rotatable about a horizontal axis of rotation perpendicular to the milling direction; a retaining device arranged in front of the milling drum housing in the milling direction with an adjustment device that enables the height adjustment of the retaining device in relation to the milling drum housing and the machine frame; and a ground contact device arranged in front of the milling drum housing in the milling direction with a contact runner and a mounting lever. The contact runner is adjustable in relation to the retaining device within a height-adjustment range and is mounted on the retaining device by way of the mounting lever. The contact runner comprises a first joint via which it is connected to the mounting lever in a pivotable fashion, the mounting lever being connected to the retaining device via a second joint and positioned between the contact runner and the retaining device in such a manner that, when the height of the retaining device is adjusted in relation to the contact runner, the mounting lever reaches or traverses an apex of the curve of movement of the mounting lever about the first or second joint, the apex delimiting the adjustment path of the mounting lever in the horizontal direction over the entire height-adjustment range, in particular in such a manner that the horizontal distance between the first and the second joint (Continued)

increases before subsequently decreasing. Finally, a distance measuring device is provided, with which the vertical distance or a correlating value between the machine frame and/or the milling drum housing and the contact runner can be measured.

18 Claims, 4 Drawing Sheets

(56) References Cited

U.S. PATENT DOCUMENTS

| | | | |
|---|---|---|---|
| 6,457,779 B1 * | 10/2002 | Busley | E01C 23/088 299/39.2 |
| 8,424,972 B2 | 4/2013 | Berning et al. | |
| 2008/0152428 A1 | 6/2008 | Berning et al. | |
| 2014/0167486 A1 | 6/2014 | Krishnamoorthy et al. | |
| 2016/0160455 A1 | 6/2016 | Vogt et al. | |
| 2016/0265356 A1 | 9/2016 | Mueller et al. | |

FOREIGN PATENT DOCUMENTS

| | | |
|---|---|---|
| DE | 102012012607 | 1/2014 |
| DE | 102015003153 | 11/2016 |
| EP | 3029200 | 6/2016 |
| WO | 2008/077963 | 7/2008 |

\* cited by examiner

GROUND MILLING MACHINE

CROSS-REFERENCE TO RELATED APPLICATION

The present application claims priority to German Patent Application Serial No. 20 2017 003 790.4, filed Jul. 18, 2017, the disclosure of which is incorporated by reference herein in its entirety.

FIELD

The invention relates to a ground milling machine.

BACKGROUND

Generic ground milling machines are used for the milling of road surfaces, e.g., in restoration and/or maintenance works on road surfaces. The essential implement for such ground milling machines is a milling device comprising a milling drum which is mounted within a milling drum housing and which is rotatable in a direction perpendicular to the working/milling direction. On the outer surface of the milling drum—typically a hollow, cylindrical support drum—a plurality of milling devices such as, e.g., cutting tools are arranged. Such a ground milling machine is disclosed, e.g., in DE102012012607.

Essential elements of such a self-propelled ground milling machine are a machine frame which is supported by front and rear travel units, e.g. wheel or caterpillar travel units, and which is at least partially height-adjustable by means of the travel units, e.g., by means of lifting columns known in the prior art. A milling drum housing with the milling drum is arranged on the machine frame. In order to ensure a milling operation that is as controlled and smooth as possible, it is also known to arrange a so-called retaining device in front of the milling drum housing in the milling direction. The latter rests on the surface of the unmilled ground and thus presses with its weight downward on the ground area lying directly in front of the milling drum in order to prevent, e.g., larger clods of ground material from breaking away. The retaining device is also height-adjustable by means of a suitable adjusting device, e.g. a hydraulic cylinder, and can thus also be raised off the ground substrate during the milling operation, if appropriate. This is often done by the operator of the ground milling machine when ground material, e.g. stones, has collected in front of the retaining device in the milling direction in order to prevent that the milling machine ends up pushing a growing mountain of ground material in front of it during the ongoing milling operation.

It is of fundamental importance for the milling operation of the ground milling machine that the operator of the ground milling machine has a relatively precise indication of the current milling depth, i.e. knows how deep the milling drum has penetrated the ground in relation to the surface of the latter. It is known in this context to connect a contact runner in the area of the retaining device, the contact runner resting on the ground surface yet to be milled and ideally remaining in contact with the ground even when the retaining device is in a raised position. The raising of the retaining device, however, results in the modification of the position of the contact runner in relation to the rest of the machine as a result of its articulated connection with the retaining device, which, in turn, results in an undesired measurement error. In the context of this problem, US2014/0167486A1 discloses a ground contact device arranged in a pivotable manner between two side plates on the retaining device and comprising a contact runner with a rotation compensation curve in order to compensate for distortions of distance measurements caused by the raising of the retaining device. The error compensation here occurs by means of the special design of the contact curve of the contact runner. This solution is, however, relatively prone to wear and tear and further requires an exact configuration of the curve of the contact runner.

EP3029200A1 teaches how to determine the milling depth inter alia by means of the elevated position of a side plate. This approach is also taught by DE102006062129A1 in addition to, additionally or alternatively, the use of a separate contact device, e.g. a contact bar. WO2008/077963A1 and DE102015003153A1 disclose the use of the retaining device together with a distance measuring device in order to determine the distance of the milling drum from the ground surface indirectly. Additionally, WO2008/077963A1 also proposes the determination of the distance values between the machine frame and the unmilled ground by means of distance measuring systems attached to the retaining device.

SUMMARY

The object of the invention is thus to indicate a contact device for which a separate control function is not necessary for different positions of the contact runner in relation to the retaining device, i.e. with which is possible to obtain a sufficiently precise determination of the milling depth with only one distance measurement device and which simultaneously has the advantage of a relatively simple design.

Essential elements of a generic ground milling machine are a machine frame which is supported by front and rear travel units and which is at least partially height-adjustable, as well as a milling drum housing arranged on the machine frame, comprising a milling drum that can be rotated on an axis of rotation extending horizontally and perpendicularly to the milling direction. Furthermore, a retaining device is arranged in front of the milling drum housing in the milling direction with an adjustment device. With the help of an adjusting device, e.g. a hydraulic cylinder, the retaining device can be adjusted in the vertical direction and is thus height-adjustable in relation to the milling drum housing and in relation to the machine frame. The ground milling machine in accordance with the invention further comprises a ground contacting device with a contact runner and a mounting lever arranged in front of the milling drum housing in the milling direction, the contact runner being adjustable in a vertical direction in relation to the retaining device within a height-adjustment range and mounted in a pivotable, moveable manner on the retaining device on an axis of rotation extending horizontally and perpendicularly to the milling direction by means of the mounting lever. Specifically, the contact runner comprises a first joint via which the mounting lever is connected in a pivotable manner with the contact runner. Moreover, the mounting lever is connected to the retaining device in an articulated manner by means of a second joint, in particular in a pivotable manner on a pivot axis extending horizontally and perpendicularly to the milling direction. The first and second joints are thus respectively in particular pivot or rotation joints with a pivot axis extending horizontally and perpendicularly to the milling direction. The particular arrangement of the mounting lever in relation to the position of the first and second joints is essential here. In accordance with the present invention and in contrast to the configurations proposed to date in the prior art, the mounting lever is positioned between the contact runner and the retaining device in such a way that the apex of the curve of movement of the mounting lever about the first or second joint delimits the adjustment path of the latter in a horizontal direction over the entire height-adjustment range, i.e. when the height of the retaining device is adjusted in relation to the contact runner, in particular in such a way that the horizontal distance between the first and second joints increases before subsequently decreasing. The definitive apex here thus relates to the theoretical path of the pivoting movement of the mounting lever about the first or second joint. The first and second joints are consequently arranged so that the vertical distance between the two is as small as possible. The effect of this action is that the horizontal movement executed by the mounting lever during the height adjustment of the retaining device is kept small enough that any measurement errors occurring at this position are practically irrelevant. This way, a separate error compensation—which has conventionally been implemented when using corresponding contact runners—is no longer required. The height-adjustment range between the retaining device and the contact runner designates the distance in a vertical direction in which the retaining device is typically adjustable in relation to the contact runner. In particular, this range is the range between the position in which the retaining device and the contact runner are simultaneously in contact with the unmilled ground surface and the position in which the retaining device is raised to the maximum extent vis-à-vis the contact runner which is still in contact with the unmilled ground surface. This range thus preferably extends in particular over a height of at least 10 mm, especially of at least 50 mm, up to a maximum of 350 mm, especially a maximum of 150 mm Finally, in accordance with the invention, a distance measuring device is provided with which the distance in a vertical direction or a correlating value between the machine frame and/or milling drum housing and the contact runner can be determined/ measured. This can be, for example, a wireless measurement device such as, e.g. an optical distance sensor, or a mechanical distance measuring device such as e.g. a pulley sensor or a distance sensor integrated in a hydraulic cylinder in a known manner (e.g. on the basis of a capacitive measuring principle). Consequently, the distance measuring device enables a determination of the actual vertical distance of the contact runner from the machine frame and/or milling drum housing or at least of a correlating value, whereby the milling depth is ultimately determined. The greater the milling depth, the smaller this distance. As a result, it is possible to make a sufficiently precise indication of the current milling depth without recurring to any further methods of correction, especially solely with this one distance measuring device. The distance ascertained via the distance measuring device (or correlating operating value) thus correlates directly with the current milling depth.

Ideally, the distance measuring device is connected to the mounting lever in an articulated fashion so that its adjustment path essentially extends in a vertical direction over the height-adjustment range. Ultimately, it is the vertical distance that is of interest for the determination of the milling depth here. The advantages of the arrangement of the mounting lever in accordance with the invention are particularly evident when the path of adjustment of the distance measuring device, i.e. the path of movement of the distance measuring device for the determination of the distance, essentially runs in a vertical direction: in this case any measurement error is marginal and acceptable as a result of the fact that the horizontal adjustment of the contact runner is particularly small when the retaining device is adjusted in a vertical direction.

Preferably, the distance measurement device is connected to the contact runner and to the machine frame or milling drum housing in an articulated manner. The arrangement on the milling drum housing has the advantage that an overall modular unit is obtained as a result, which facilitates, e.g., the swapping of milling drum housings with different milling widths on the ground milling machine.

In particular in light of its arrangement in an area exposed to debris, the distance measuring device is advantageously a linear actuator, in particular a hydraulic cylinder-piston unit, with an integrated distance measuring device. Such distance measuring devices are protected particularly well from external debris and are thus advantageous in the present content.

In principle, the distance measuring device can be connected to the contact runner anywhere. However, in order to obtain an overall arrangement that is as compact as possible, the articulated connection of the distance measuring device to the contact runner preferably occurs between the first and second joint as viewed in the milling direction.

The crux of the present invention is thus that a horizontal displacement of the longitudinal axis of the vertical adjustment path of the distance measuring device is kept to a minimum by the special arrangement in accordance with the invention, which makes use of the apex of the movement of the mounting lever in a horizontal direction. The connection of the distance measuring device here, in particular in the form of a hydraulic cylinder with an integrated distance measuring device, is particularly preferably articulated in such a manner that the adjustment path extends essentially in a vertical direction. Ideally, the theoretical trajectory of the pivot movement of the distance measuring device executed by the latter when the retaining device is adjusted as far as possible upward in the vertical direction in relation to the contact runner transects a lower peak in the vertical direction, thus again improving measurement accuracy. In practice, the contact runner rests on the ground surface so that, in the vertical position of the distance measuring device (the path of adjustment of the distance measurement device runs exactly in a vertical direction), the measurement error is lowest and increases with increasing deviation from the vertical position. The overall arrangement here is thus preferably configured in such a way that the maximum deviation of the longitudinal axis of the path of adjustment of the distance measuring device from a fictive vertical references axis is less than +/−8° and in particular less than +/−2° and/or the radius of the pivoting movement of the mounting lever about the first joint lies in the range of at least 15 cm and in particular at least 20 cm. It is thus essential that the horizontal adjustment motion of the contact runner is comparatively small over the entire height-adjustment range between the contact runner and the retaining device so that the horizontal deflection of the distance measuring device is kept to a minimum. In particular, sufficiently precise measurement results are still obtained in practice when the horizontal adjustment path of the contact runner is a maximum of 5 cm, in particular a maximum of 3 cm and especially a maximum of 2 cm, over the entire height-adjustment range.

The mounting lever is preferably arranged in relation to the distance measuring device in such a way that the distance of the first and second joint of the mounting lever, i.e. preferably the longitudinal extension of the same, and the linear path of adjustment of the distance measuring device are at right angles over the range of adjustment of the retaining device in relation to the contact runner, in particular when the retaining device and the contact runner are approximately in the middle of their maximum range of adjustment in the vertical direction with respect to one another. This arrangement has the advantage that both the apex lying in the horizontal direction of the mounting lever and the apex lying in the vertical direction of the adjustment path of the distance measuring device are traversed essentially simultaneously and, based on this position, the measurement error in both adjustment directions is minimal. This way, the maximum measurement error of the distance measuring device can be kept relatively small over the entire spectrum of positions between the mounting lever and the contact runner.

All indications of ranges here relate in particular to a range of adjustment between the retaining device and the contact runner between a position in which both the retaining device and the contact runner rest on the ground surface and a position in which the contact runner rests on the ground surface and the retaining device is raised in the vertical direction as far as it will go, e.g. up to a maximum of 350 mm and in particular up to a maximum of 150 mm.

There are several possible variants for the specific configuration of the mounting lever. In principle, the mounting lever is preferably a straight element with a longitudinal extension. This obviates relatively complex and thus more expensive designs of the mounting lever. Additionally or alternatively, the mounting lever can be configured in the shape of a mounting fork, while the contact runner in this case is arranged between the arms of the mounting fork lying opposite one another. This arrangement facilitates a particularly reliable guidance of the contact runner over the ground surface by means of the mounting lever. Additionally or alternatively, in order to improve the position of the contact runner on the ground surface, a force acting in the direction of the ground surface can be applied to the mounting lever. This can occur by means of a separate adjusting element, e.g. a tension or pressure spring, or with a hydraulic cylinder. It is ideal, however, if the mounting lever comprises a ballast weight in the area of the first joint in order to increase the contact force of the contact runner in the front area of the latter.

According to the present invention, the ground milling machine preferably comprises a control unit configured in such a manner that it determines the milling depth based on the distance value ascertained by the distance measuring device, in particular as a real-time measurement value exclusively on the basis of the determined distance value. The control unit is thus connected to the distance measuring device via a signal-transmitting connection and, from the measurement signal, generates a milling depth display which ideally can be viewed by the operator on a suitable display device. The control unit can carry out, e.g., a documentation and determination of a zero point at the beginning of the milling operation.

In principle, it is possible to carry out the distance determination and the corresponding milling depth determination with only one contact runner. Preferably, however, a contact device is arranged on opposite sides of the retaining device with respect to the axis of rotation of the milling drum, in particular in the area between the two side plates of the milling drum housing in relation to the milling direction. This way, a corresponding milling depth measurement can be carried out on both sides simultaneously.

BRIEF DESCRIPTION OF THE DRAWINGS

In the following, the invention is described in greater detail with the help of the embodiment shown in the figures, which show schematically.

DETAILED DESCRIPTION

Figure 1:
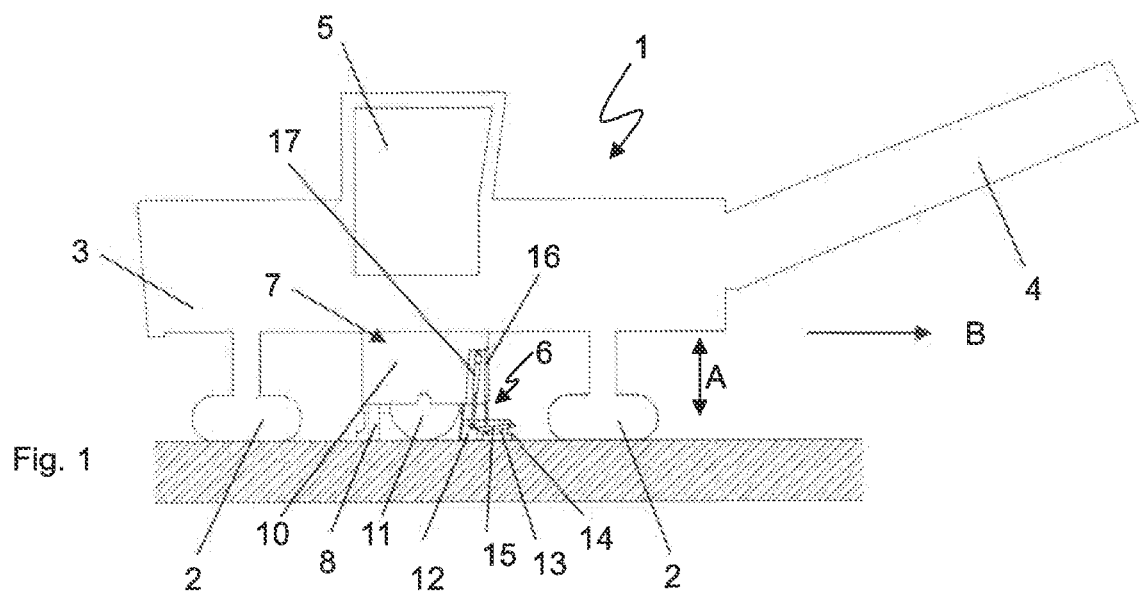
FIG. 1 is a side view of a ground milling machine.

FIG. 1 shows the essential elements of a self-propelled ground milling machine 1. The ground milling machine 1 comprises a machine frame 3, which is supported by travel units 2 (e.g. wheels or caterpillar tracks) and which is height-adjustable (in the direction of the arrow A; by means of lifting columns between the travel units 2 and the machine frame 3), a load conveyor belt 4, an operating platform 5, a drive motor (not depicted) as well as a milling device 6 which is arranged on the machine frame 3 and thus also height-adjustable. In the embodiment shown, the milling device 6 is arranged essentially in the middle relative to the longitudinal direction of the machine; however, it can also be arranged in the rear area between the two rear travel units 2 in particular in the case of small or compact milling machines. During a milling operation, the ground milling machine drives in the milling direction B as the milling device 6 penetrates the ground surface. The milling device 6 comprises a milling drum housing 7 with a rear, height-adjustable scraper plate 8, with height-adjustable side plates 9 (not shown in FIG. 1, but shown in FIG. 2), with a support housing 10 connected to the machine frame in a fixed manner, and with a milling drum 11 arranged inside the support housing in a known manner. The latter can be rotated about a horizontal axis of rotation extending in a direction perpendicular to the milling direction and comprises a plurality of milling tools on its outer surface, in particular cutting tools. In front of the milling drum in the milling direction B is a retaining device 12, e.g. configured as a grate, which is mounted on the milling drum housing in a height-adjustable manner. The latter rests on the ground surface and prevents the road surface in front of the milling drum from breaking up into larger pieces during the milling process. The retaining device 12 can simultaneously act as a belt mount for a conveyor belt, e.g., in order convey milled material from the milling drum housing onto the so-called external conveyor belt 4 indicated schematically in FIG. 1. The retaining device 12 can be raised from the ground and lowered by means of an adjusting element, a hydraulic cylinder 17 in this embodiment. The hydraulic cylinder 17 sits between the retaining device 12 and the milling drum housing and essentially extends in a vertical direction.

Finally, a contact device 13 is provided, which comprises a contact runner 14, a mounting lever 15 and a distance measuring device 16. The contact runner 14 rests on the ground surface. In the front as viewed in the milling direction B, the contact runner 14 is connected to the retaining device 12 in an articulated manner via the mounting lever 15. In the rear in relation to the milling direction B, the contact runner is connected to the distance measuring device 16, which is a hydraulic cylinder which is adjustable in a linear direction and which comprises an integrated distance measuring device of a kind known in the prior art (e.g. capacitive sensor). The hydraulic cylinder, which is arranged essentially vertically with respect to its adjustment path S (FIG. 5), makes it possible to raise the contact runner 14 for the transport of the ground milling machine 1, as well as for the distance measurements. Consequently, with the help of the distance measuring device 16, the distance along the essentially vertical adjustment path of the hydraulic cylinder between the compact runner 14 and the articulated connection of the hydraulic cylinder to the milling drum housing and thus ultimately the distance of the machine frame from the ground surface or the milling depth of the ground milling machine can be determined, as described in greater detail below. The adjustment path S here designates the longitudinal extension of the measurement axis of the distance measuring device, i.e. the axis along which the distance is determined with the help of the distance measuring device.

Figure 2:
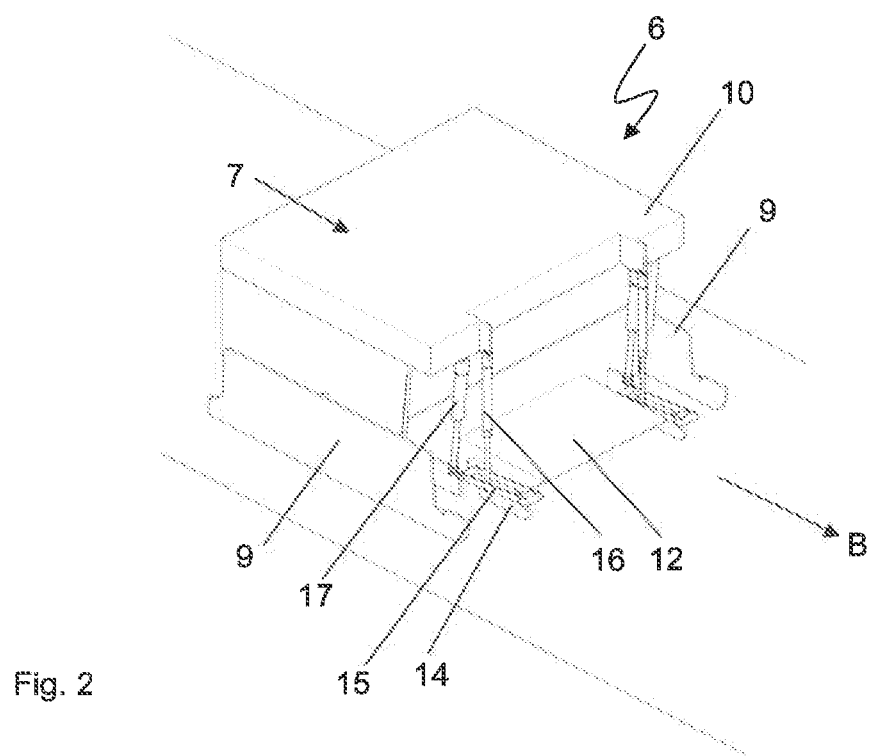
FIG. 2 is a perspective oblique view of the milling drum housing shown in FIG. 1.

FIG. 2 shows the arrangement described above in detail, although for reasons of clarity only the support housing 10 and the elements mounted on the latter are depicted here, while the machine frame 3 and other elements not directly related to the milling device have been omitted. What is important is that it is clear from the view shown in FIG. 2 that a contact device 13 of the kind described above is provided both on the right as well as on the left side (as viewed in the milling direction B), both contact devices 13 being positioned in the area between the two side plates 9 arranged externally on the support housing 10 and lying opposite one another. Moreover, the compact devices 13 are arranged next to the retaining device 12 at the same height and opposite each other in relation to a horizontal axis perpendicular to the milling direction B.

Figure 3A:
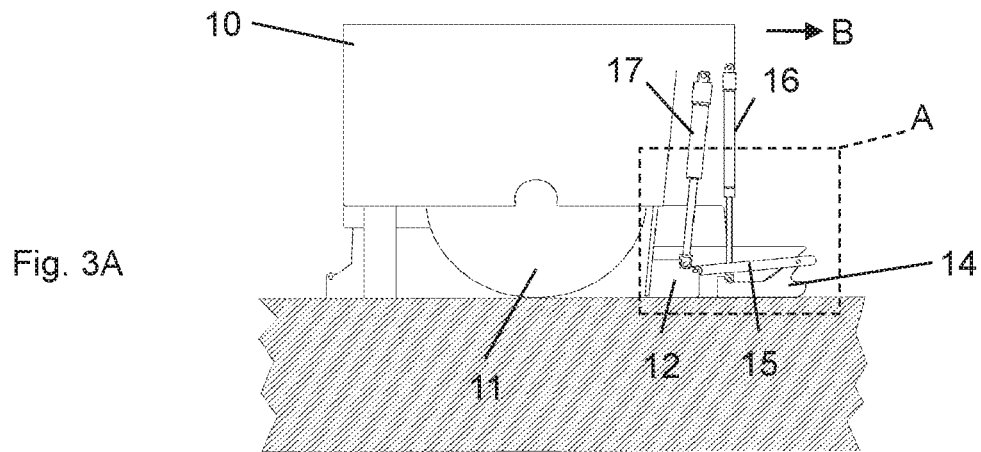
FIG. 3A is a side view of the milling drum housing, the retaining device and the contact device, with the milling drum in the "scraping" position.
Figure 3B:
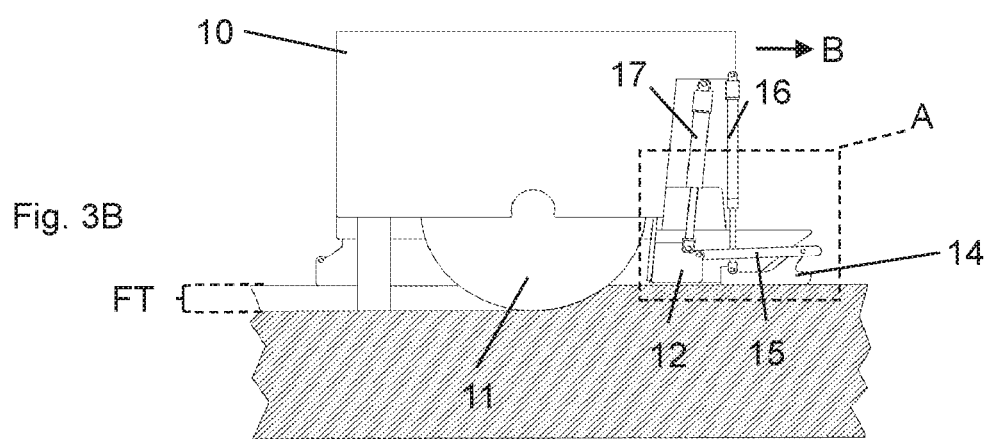
FIG. 3B is a side view of the milling housing shown in FIG. 3A with the milling drum lowered to a milling depth FT.
Figure 3C:
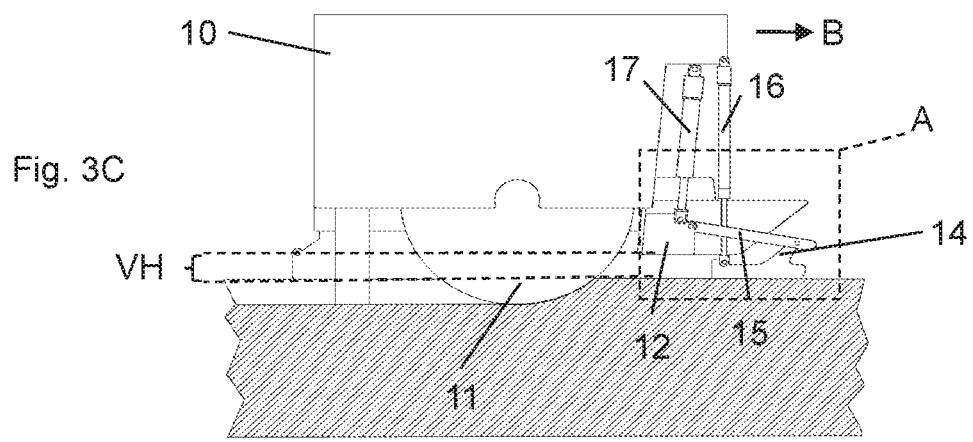
FIG. 3C is a side view of the milling drum housing shown FIG. 3A with a raised retaining device.
Figure 4A:
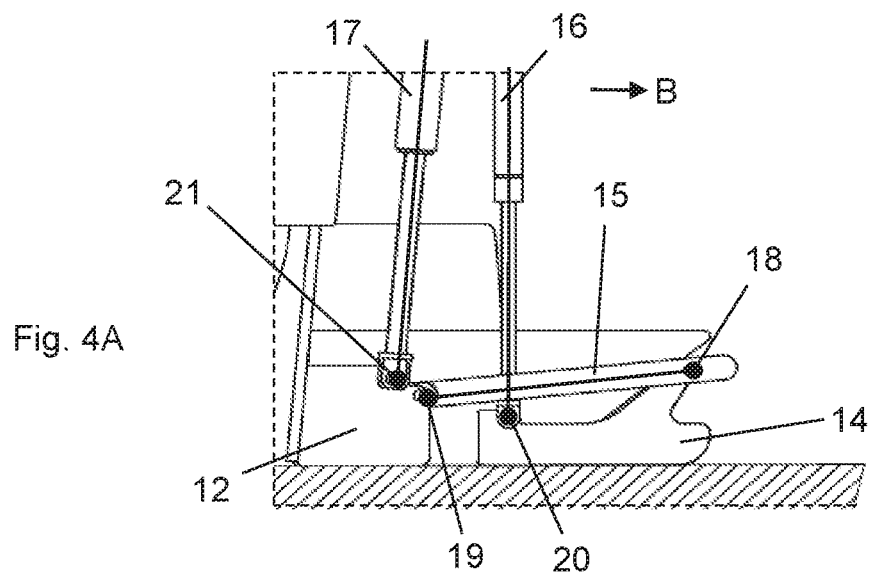
FIG. 4A is an enlargement of the area A shown in FIG. 3A.
Figure 4B:
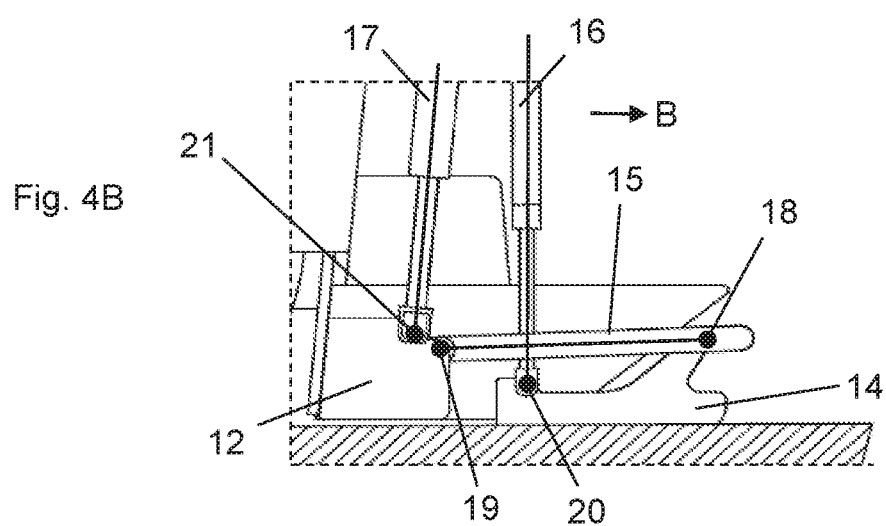
FIG. 4B is an enlargement of the area A shown in FIG. 3B.
Figure 4C:
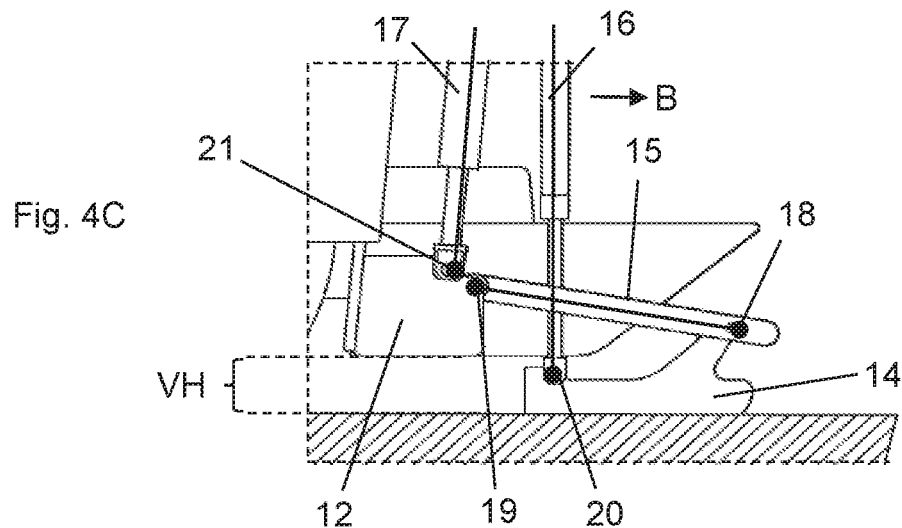
FIG. 4C is an enlargement of the area A shown in FIG. 3C.

Based on the basic arrangement outlined above, further details of the invention are provided with reference to the sectional views of FIGS. 3A to 3C as well as to the enlargements of the area A in these figures as depicted in FIGS. 4A to 4C.

FIGS. 3A and 4A show the zero point of the overall arrangement. The milling drum 11, the retaining device 12 and the contact runner 14 all rest on the unmilled ground surface. This position is also called "scratching". In FIGS. 3B and 4B, the milling drum is lowered to a milling depth FT in the vertical direction in relation to the unmilled ground surface, e.g. by retraction of in particular at least the front lifting columns of the front travel units. On the other hand, the retaining device 12 and the contact runner 14, which are both arranged in front of the milling drum in the milling direction B, still rest on the surface of the unmilled ground. Their position in relation to one another thus has not changed. Finally, FIGS. 3C and 4C show a situation that occurs frequently during a milling operation, namely when the operator of the ground milling machine raises the retaining device 12 from the unmilled ground surface in the vertical direction by a vertical distance VH because, for example, too much loose ground material such as, e.g. stones, has accumulated in front of the retaining device 12 in the milling direction B and is simply being pushed forward by the latter. This is carried out during the milling operation. By raising the retaining device 12, this material then slides through to the milling drum housing following behind it. In order to avoid being "blind" in this situation with respect to the milling depth, it is important that the contact runner 14 of the contact device 13 remains in contact with the surface of the unmilled ground and that the position of the distance measuring device 16 along its adjustment path, if possible, does not change or, if it does change, then only to a very limited degree. The arrangement in accordance with the invention described below in particular with reference to FIGS. 4A to 4C and 5, in particular the described arrangement of the mounting lever 15, makes it possible to draw sufficiently precise inferences regarding the current milling depth with the contact runner 14 in the situations shown respectively in FIGS. 3B/4B and FIGS. 3C/4C without having to resort to a separate error compensation step. FIGS. 3A to 4C illustrate further that the hydraulic cylinder of the distance measuring device 16 is essentially compressed by a vertical distance corresponding to the current milling depth when the milling drum penetrates the ground surface. This correlation is exploited for the determination of the milling depth using the distance measuring device.

It is essential that the mounting lever 15 stabilizes the compact runner 14 in particular vis-à-vis a deflection perpendicular to the milling direction B. The mounting lever 15 is connected to both the contact runner 14 as well as the retaining device 12 in an articulated fashion. Accordingly, a first joint 18 is provided, with which the mounting lever 15 is connected to the contact runner 14. Moreover, a second joint 19 is provided, with which the mounting lever 15 is mounted on the retaining device 12. The mounting lever 15 itself is configured as a longitudinal element extending between the two joints 18 and 19. Moreover, as already described above, the contact runner 14 is connected to the rest of the machine, in particular to the milling drum housing or the machine frame, by means of the distance measuring device 16, configured here as a linear hydraulic cylinder which can be adjusted along its longitudinal axis. The contact runner 14 is thus attached to the distance measuring device 16 in an articulated fashion via a contact runner joint 20. The retaining device 12 is also attached to the hydraulic cylinder 17 in an articulated manner as well as, via the same connection, to the ground milling machine 1 by means of the retaining device joint 21.

In particular a comparison between FIGS. 4B and 4C shows how the retaining device 12 can be raised from the working position shown in FIG. 4 by a vertical distance VH by means of the hydraulic cylinder 17 in order to drive over material that has accumulated in front of the retaining device 12. As a result of the connection between the contact runner 14 and the retaining device 12 via the mounting lever 15, the contact runner 14 is moved by the mounting lever 15 as a result of the vertical adjustment of the retaining device 12 horizontally in the direction of a horizontal adjustment path HS (indicated as a dashed line in FIG. 5 on the right). For example, if the first joint 18 lies vertically above the second joint 19 while the retaining device 12 is raised vertically upward, the contact runner 14 is first pressed forward in the milling direction B by the mounting lever 15 before being pulled back again after traversing an apex in the horizontal direction. If, on the other hand, the first joint 18 lies vertically below the second joint 19 while the retaining device is raised vertically upward, the contact runner 14 is pulled rearward against the milling direction B by the mounting lever 15. In both cases, the contact runner 14 is moved horizontally out of the working position shown in FIG. 4B in which in particular the distance measuring device 16 stands perpendicularly or vertically on the ground surface. As the distance measuring device 16 measures the vertical distance from the ground, the measuring result of the distance measuring device 16 is falsified by any horizontal movement of the contact runner 14, as explained above. The further the contact runner 14—and thus also the distance measuring device 16—is moved or pushed out of the vertical position shown in FIG. 4B, i.e. the working position, in a horizontal direction, the greater the falsification of the measurement result.

According to the present invention, in order to minimize this falsification of the measurement result, the vertical adjustment movement of the retaining device 12 comprises both a movement during which the first joint 18 lies vertically higher than the second joint 19 as well as a movement during which the first joint 18 lies vertically lower than the second joint 19. Both parts are naturally connected by a moment during which the two joints 18, 19 lie in a common horizontal plane, i.e. in which the mounting lever 15 is arranged horizontally. At this moment the horizontal distance of the first joint 18 from the second joint 19 is at a maximum. The vertically upward movement of the retaining device 12 comprises a movement during which the contact runner 14 is pushed forward in the milling direction B by the mounting lever 15 and a movement during which the contact runner 14 is pulled back, i.e. rearward, against the milling direction B. During one and the same upward movement of the retaining device 12 (as well as, of course, during the opposite downward movement), the contact runner 14 is moved both slightly forward in the milling direction as well as rearward against the milling direction B. The overall horizontal movement HS of the contact runner 14 resulting from both movements is thus essentially smaller than in machines of the prior art, as the movements in opposite directions cancel each other out. The resulting movement of the contact runner 14 during the vertical adjustment of the retaining device 12 is an oscillation about the working position of the contact runner 14 shown in FIG. 4B in which the distance measuring device 16 is vertical on the ground and provides optimal measurement results. As a result of the arrangement in accordance with the invention, the movement of the contact runner 14 and of the distance measuring device 16 out of the working position is significantly smaller than in the prior art. Consequently, the measurement errors are also significantly smaller and in a range in which they do not have a significant influence on the final result. It is thus possible in accordance with the invention to ignore the measurement errors generated without having to compensate for them in a laborious manner.

Figure 5:
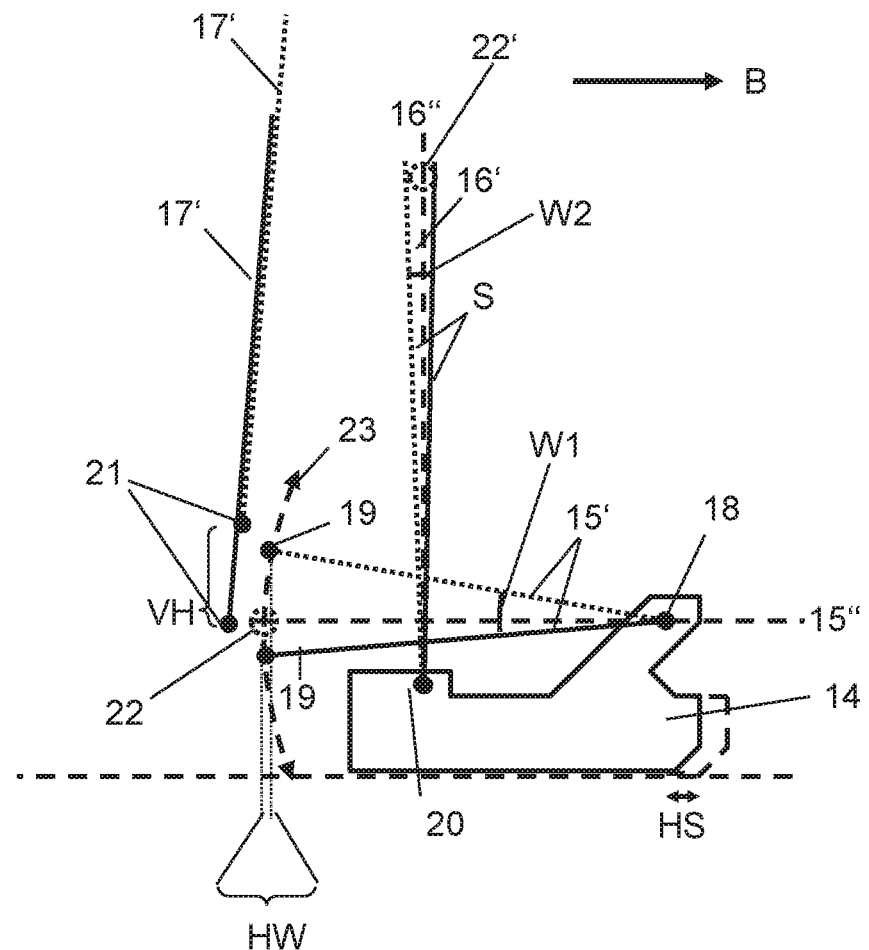
FIG. 5 is a schematic sketch to illustrate the arrangement principle according to the present invention.

FIG. 5 shows the sequence of movements in detail in a superimposed view. In order to be able to illustrate both the working position of the relevant elements as well as the position in which the retaining device 12 is in the raised state in the same figure, the retaining device 12 is not shown here. The mounting lever 15, the distance measuring device 16 and the hydraulic cylinder 17 are also omitted; however, the longitudinal axes of the same to the respective joints 18, 19, 20, 21 are shown. The longitudinal centre lines 15' thus designate the longitudinal centre lines of the mounting lever 15 (i.e. the line connecting the joints 18 and 19), the longitudinal centre lines 16' designate the longitudinal centre lines of the distance measuring device 16 (i.e. the axis of its adjustment path) and the longitudinal centre lines 17' designate the longitudinal centre lines of the hydraulic cylinder 17 (via which the retaining device can be raised), while the solid longitudinal centre line respectively indicates the working position of the respective elements according to FIG. 4B, while the dotted longitudinal centre lines respectively indicate the positions of the elements in the position in which the retaining device 12 is in the vertically raised state. In order to further elucidate the horizontal movement of the contact runner 14 by the mounting lever 15, it is assumed in the illustration shown in FIG. 5 that the contact runner 14 is mounted in a fixed and stationary manner, i.e. the superimposition shown in FIG. 5 is viewed from the perspective of the contact runner 14. Deviating from this view, a horizontal adjustment range HS is indicated in the lower, right corner of the figure with a dashed line, showing how the contact runner 14 would move from the perspective of the machine frame if moving freely.

When the retaining device 12 moves vertically upward in the direction VH, the mounting lever 15 also pivots upward on the side connected to the retaining device 14, as indicated by the longitudinal centre lines 15' of the mounting lever 15 shown in FIG. 5. The mounting lever moves here about an angle W1. The second joint 19 by means of which the mounting lever 15 is connected to the retaining device 12 thus moves along a movement curve 23 indicated by the dashed arrow. As a result, the horizontal distance between the first joint 18 and the second joint 19 changes by the distance designated as the horizontal path HW. In reality, the distance designated as the horizontal path HW of the second joint 19 in FIG. 5 is translated by the mounting lever 15 into a movement of the contact runner 14. As is evident from FIG. 5, the construction in accordance with the present invention leads to a corresponding horizontal path HW that is extremely small. This is because the mounting lever 15 is moved through the curve of movement 23, which is limited in the horizontal direction by the apex 22. The mounting lever 15 or more specifically the second joint 19 passes the apex 22 of the movement curve 23, thus bringing about a reversal of the direction in which the contact runner 14 is moved by the mounting lever. During a movement of the retaining device 12 vertically upward or downward, the contact runner 14 is indeed moved horizontally in milling direction B; however, a reversal of the direction of movement of the contact runner 14 also occurs during the movement of the retaining device 12 in a single direction, i.e. either upward or downward. This way, the overall distance by which the contact runner 14 is moved out of the working position shown in FIG. 4B is minimized so that overall the resulting measurement error of the distance measuring device 16 is kept as low as possible. The same ultimately applies to the distance measuring device, which pivots about the joint 20 in an angular range W2. An apex 22', which delimits here in the vertical direction, is also traversed. It is also important in the present arrangement that the mounting lever and the distance measuring device are arranged in a manner that the axes 15' and 16' traverse a position in which they are at right angles in relation to one another when the retaining device is raised. This transitional situation is indicated in FIG. 5 by the dotted lines and the axes 15" and 16".

What is claimed is:
1. A ground milling machine, comprising:
a machine frame supported by front and rear travel units and at least partially height-adjustable;
a milling drum housing arranged on the machine frame, comprising a milling drum that is rotatable about a horizontal axis of rotation perpendicular to a milling direction;

a retaining device arranged in front of the milling drum housing in the milling direction with an adjustment device that enables height adjustment of the retaining device in relation to the milling drum housing and the machine frame; and a ground contact device arranged in front of the milling drum housing in the milling direction with a contact runner and a mounting lever, wherein the contact runner is height adjustable in relation to the retaining device within a height-adjustment range, wherein the contact runner is mounted on the retaining device by the mounting lever, wherein the contact runner is pivotably connected to the mounting lever via a first joint, wherein the mounting lever is pivotably connected to the retaining device via a second joint, wherein the mounting lever is operable between the contact runner and the retaining device such that, when a height of the retaining device is adjusted in relation to the contact runner, a horizontal distance between the first and the second joint increases before subsequently decreasing, and a distance measuring device with which a vertical distance, or a value which correlates to the vertical distance, between the machine frame and/or milling drum housing and the contact runner is measurable.

2. The ground milling machine according to claim 1, wherein the distance measuring device is connected to the contact runner with an articulated connection.

3. The ground milling machine according to claim 2, wherein the articulated connection is configured such that a path of adjustment of the distance measuring device extends in an essentially vertical direction over the height-adjustment range.

4. The ground milling machine according to claim 1, wherein the distance measuring device is connected to the contact runner and to the machine frame or milling drum housing with an articulated connection, respectively.

5. The ground milling machine according to claim 1, wherein the distance measuring device comprises a linear actuator.

6. The ground milling machine according to claim 5, wherein the linear actuator comprises a hydraulic cylinder-piston unit, with an integrated distance measuring device.

7. The ground milling machine according to claim 1, wherein an articulated connection of the distance measuring device to the contact runner lies between the first joint and the second joint when viewed in the milling direction.

8. The ground milling machine according to claim 1, wherein a maximum deviation of a longitudinal axis of an adjustment path of the distance measuring device from a fictional vertical reference axis is smaller than +/−8° and/or a radius of a pivoting movement of the mounting lever about the first joint is in a range of at least 15 cm.

9. The ground milling machine according to claim 8, wherein the maximum deviation of the longitudinal axis of the adjustment path of the distance measuring device from the fictional vertical reference axis is smaller than +/−2°.

10. The ground milling machine according to claim 8, wherein the radius of the pivoting movement of the mounting lever about the first joint is in the range of at least 20 cm.

11. The ground milling machine according to claim 1, wherein a horizontal adjustment movement of the contact runner is a maximum of 5 cm over the height-adjustment range.

12. The ground milling machine according to claim 1, wherein the mounting lever comprises a straight element with a longitudinal extension and/or is configured in a shape of a mounting fork, with the contact runner being arranged between two opposite arms of the mounting fork.

13. The ground milling machine according to claim 1, further comprising a control unit configured to determine a milling depth based on a distance value determined by the distance measuring device.

14. The ground milling machine according to claim 13, wherein the control unit is further configured to determine the milling depth based on the distance value determined by the distance measuring device as a real-time measurement value based solely on the distance value determined by the distance measuring device.

15. The ground milling machine according to claim 1, further comprising a contact device arranged on both sides of the retaining device as viewed in a direction of the horizontal axis of rotation of the milling drum.

16. The ground milling machine according to claim 1, wherein, from a working position of each of the retaining device and the contact runner relative to each other, the retaining device is height adjustable by the adjustment device, via a height adjustment movement, to a raised position, wherein, when each of the retaining device and the contact runner are in the working position, respectively, the second joint is vertically lower than the first joint, wherein, when the retaining device is in the raised position and the contact runner is in the working position, the second joint is vertically higher than the first joint, wherein, when the retaining device is adjusted from the working position thereof to the raised position, the second joint travels upward along the height adjustment movement with the retaining device, wherein the height adjustment movement occurs along a curve where the second joint pivots about the first pivot, and wherein, when the second joint travels from the working position of the retaining device upward along the height adjustment movement, the horizontal distance between the first and the second joint increases until the second joint and the first joint are vertically equal to one another, and thereafter the horizontal distance between the first and the second joint decreases when the second joint travels upward along the height adjustment movement to the raised position of the retaining device.

17. The ground milling machine according to claim 16, wherein, when the horizontal distance between the first and the second joint increases as the second joint travels from the working position of the retaining device upward along the height adjustment movement, the contact runner moves forward relative to the milling direction, and when the horizontal distance between the first and the second joint decreases as the second joint travels upward along the height adjustment movement to the raised position of the retaining device, the contact runner moves rearward relative to the milling direction.

18. The ground milling machine according to claim 16, wherein the working position of each of the retaining device and the contact runner is a scratching position.

* * * * *